US012109884B2

(12) United States Patent
Kim et al.

(10) Patent No.: US 12,109,884 B2
(45) Date of Patent: Oct. 8, 2024

(54) PEDAL APPARATUS FOR VEHICLE

(71) Applicants: Hyundai Motor Company, Seoul (KR); Kia Corporation, Seoul (KR); Kyung Chang Industrial Co., Ltd., Daegu (KR)

(72) Inventors: Eun Sik Kim, Gwangmyeong-si (KR); Kyung Nam Kim, Daegu (KR); Dae Yeon Kim, Daegu (KR); Hyeon Uk Kim, Daegu (KR)

(73) Assignees: HYUNDAI MOTOR COMPANY, Seoul (KR); KIA CORPORATION, Seoul (KR); KYUNG CHANG INDUSTRIAL CO., LTD., Seoul (KR)

( * ) Notice: Subject to any disclaimer, the term of this patent is extended or adjusted under 35 U.S.C. 154(b) by 0 days.

(21) Appl. No.: 18/134,691

(22) Filed: Apr. 14, 2023

(65) Prior Publication Data
US 2024/0181873 A1 Jun. 6, 2024

(30) Foreign Application Priority Data
Dec. 6, 2022 (KR) .................. 10-2022-0169076

(51) Int. Cl.
*B60K 26/02* (2006.01)
*B60N 3/06* (2006.01)
*B60T 7/06* (2006.01)
*B60W 60/00* (2020.01)

(52) U.S. Cl.
CPC ............ *B60K 26/02* (2013.01); *B60N 3/06* (2013.01); *B60T 7/06* (2013.01); *B60K 2026/026* (2013.01); *B60W 60/005* (2020.02)

(58) Field of Classification Search
CPC .... B60K 26/02; B60K 2026/026; B60N 3/06; B60T 7/06; B60W 60/005
See application file for complete search history.

(56) References Cited

U.S. PATENT DOCUMENTS

| 10,889,226 | B1* | 1/2021 | Dean ..................... B60T 7/06 |
| 2011/0023652 | A1 | 2/2011 | Cosby et al. |
| 2020/0257329 | A1* | 8/2020 | Kihara ................ G05G 5/06 |
| 2021/0271285 | A1* | 9/2021 | Viethen ............... B60K 26/02 |
| 2024/0059143 | A1* | 2/2024 | Ito ....................... B60T 7/042 |

FOREIGN PATENT DOCUMENTS

| CN | 112912817 A | 6/2021 | |
| CN | 214202197 U | 9/2021 | |
| DE | 102020207238 A1 * | 12/2021 | .......... B60K 26/02 |
| EP | 3 744 552 A1 | 12/2020 | |
| JP | 2003-165426 A | 6/2003 | |
| KR | 10-2007-0040220 A | 4/2007 | |
| KR | 10-2021-0007722 A | 1/2021 | |

OTHER PUBLICATIONS

Translation of DE 102020207238 obtained from FIT database (Year: 2021).*

* cited by examiner

*Primary Examiner* — Thomas C Diaz
(74) *Attorney, Agent, or Firm* — Morgan, Lewis & Bockius LLP (57) ABSTRACT

A pedal apparatus for a vehicle, may include a brake pedal assembly, an accelerator pedal assembly, and a footrest panel are assembled to one another to form a single module component, and the completely assembled module component is supplied to an assembling line for a vehicle and assembled to a dash panel which is a vehicle body.

18 Claims, 10 Drawing Sheets

PEDAL APPARATUS FOR VEHICLE

CROSS REFERENCE TO RELATED APPLICATION

The present application claims priority to Korean Patent Application No. 10-2022-0169076, filed Dec. 6, 2022, the entire contents of which is incorporated herein for all purposes by this reference.

BACKGROUND OF THE PRESENT DISCLOSURE

Field of the Present Disclosure

The present disclosure relates to a pedal apparatus for a vehicle, and more particularly, to a technology associated with a pedal apparatus for a vehicle, in which a brake pedal assembly, an accelerator pedal assembly, and a footrest panel are modularized into a single component.

DESCRIPTION OF RELATED ART

A vehicle is provided with a brake pedal assembly for braking the vehicle and an accelerator pedal assembly for accelerating the vehicle.

The brake pedal assembly and the accelerator pedal assembly are independently provided on a dash panel and disposed in a lower space of a driver seat, and then a footrest panel is coupled to the dash panel and covers the remaining part except for the accelerator pedal pad and the brake pedal pad.

As described above, generally, the brake pedal assembly, the accelerator pedal assembly, and the footrest panel are separately supplied to a vehicle assembling line, and assembling processes in the assembling line are independently performed in accordance with the order, which causes problems in that an excessively large amount of working time is required, and productivity deteriorates.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a pedal apparatus for a vehicle, in which a brake pedal assembly, an accelerator pedal assembly, and a footrest panel are assembled to one another and modularized into a single component, which makes it possible to contribute to a reduction in assembling time in a vehicle assembling line, improvement on productivity, and a reduction in number of components and costs.

Various aspects of the present disclosure are directed to providing a pedal apparatus for a vehicle, the pedal apparatus including: a brake pedal assembly, an accelerator pedal assembly, and a footrest panel that are assembled to one another to form a single module component, in which the single module component is provided by being assembled to a vehicle body.

The brake pedal assembly may have an accelerator pedal seating portion, the accelerator pedal assembly may be accommodated on the accelerator pedal seating portion and assembled to the brake pedal assembly, and the footrest panel may be assembled to the brake pedal assembly and the accelerator pedal assembly.

The brake pedal assembly may include: a brake pedal housing coupled to a brake pedal arm and including an accelerator pedal seating portion provided at one side of the brake pedal; and a brake pedal pad coupled to an end of the brake pedal arm.

The accelerator pedal assembly may include: an accelerator pedal housing coupled to an accelerator pedal arm, positioned on the accelerator pedal seating portion, and assembled to the brake pedal housing; and an accelerator pedal pad coupled to an end of the accelerator pedal arm.

First and second opposite end portions of the footrest panel may be assembled to the brake pedal housing and the accelerator pedal housing so that the footrest panel simultaneously covers the brake pedal housing and the accelerator pedal housing in a state in which the accelerator pedal housing is accommodated on the accelerator pedal seating portion and assembled to the brake pedal housing.

A width of the accelerator pedal seating portion in a leftward and rightward direction may be greater than a width of the accelerator pedal housing in the leftward and rightward direction so that the accelerator pedal housing is provided to be accommodated in the accelerator pedal seating portion.

A plurality of vehicle body coupling portions may protrude from the brake pedal housing in a leftward and rightward direction thereof.

A plurality of reinforcement ribs may extend from the accelerator pedal seating portion in the leftward and rightward direction and be connected to the vehicle body coupling portions.

A plurality of coupling protrusions may be provided on a sidewall of the brake pedal housing that defines the accelerator pedal seating portion, and protrusion assembling grooves, into which the coupling protrusions are inserted, may be formed in one side surface of the accelerator pedal housing that faces the sidewall.

A plurality of coupling holes, which is matched with one another, may be formed in the accelerator pedal seating portion and the accelerator pedal housing, and the brake pedal housing and the accelerator pedal housing may be assembled by coupling members fastened to the coupling holes.

A plurality of assembling protrusions may be provided on one side surface of the brake pedal housing and one side surface of the accelerator pedal housing in a state in which the accelerator pedal housing is positioned on the accelerator pedal seating portion, a plurality of panel protrusions, which is matched with the assembling protrusions, may be formed at first and second opposite end portions of the footrest panel, and the footrest panel may be assembled to simultaneously cover the brake pedal housing and the accelerator pedal housing by coupling members fastened to the assembling protrusions while penetrating the panel protrusions.

The brake pedal assembly may implement a foldable function by operation of a brake pedal foldable mechanism fixed to the brake pedal housing and connected to the brake pedal arm.

The accelerator pedal assembly may implement a foldable function by operation of an accelerator pedal foldable mechanism fixed to the accelerator pedal housing and connected to the accelerator pedal arm.

The brake pedal foldable mechanism and the accelerator pedal foldable mechanism may be disposed to be positioned between the brake pedal pad and the accelerator pedal pad.

The brake pedal foldable mechanism may include: an actuator configured to generate power; and a gear member configured to engage the actuator and the brake pedal arm, and the accelerator pedal foldable mechanism may include: an actuator configured to generate power; and a gear member configured to engage the actuator and the accelerator pedal arm.

By operations of the actuator and the gear member of the brake pedal foldable mechanism, a brake pedal may switch to a hidden state in the brake pedal is hidden in the brake pedal housing so that a driver cannot operate the brake pedal in an autonomous driving mode and a pop-up state in which the brake pedal protrudes from the brake pedal housing so that the driver operates the brake pedal in a manual driving mode, and by operations of the actuator and the gear member of the accelerator pedal foldable mechanism, an accelerator pedal may switch to a hidden state in which the accelerator pedal is hidden in the accelerator pedal housing so that the driver cannot operate the accelerator pedal in the autonomous driving mode and a pop-up state in which the accelerator pedal protrudes from the accelerator pedal housing so that the driver operates the accelerator pedal in the manual driving mode.

The footrest panel may be assembled in a state in which the accelerator pedal housing is accommodated on the accelerator pedal seating portion and assembled to the brake pedal housing, and the footrest panel may be provided to be in surface-contact with the brake pedal housing and the accelerator pedal housing while simultaneously covering the brake pedal housing and the accelerator pedal housing so that the brake pedal housing and the accelerator pedal housing support the footrest panel.

The brake pedal housing and the brake pedal arm may be coupled and assembled, the accelerator pedal housing and the accelerator pedal arm may be coupled and assembled, the accelerator pedal housing may be accommodated on the accelerator pedal seating portion, the accelerator pedal housing and the brake pedal housing may be assembled, the footrest panel may be assembled to the brake pedal housing and the accelerator pedal housing to simultaneously cover the brake pedal housing and the accelerator pedal housing, and the brake pedal pad and the accelerator pedal pad may be assembled to the brake pedal arm and the accelerator pedal arm so that the brake pedal assembly, the accelerator pedal assembly, and the footrest panel are assembled to one another to form the single module component.

According to the pedal apparatus for a vehicle according to an exemplary embodiment of the present disclosure, during the process of assembling the component, the brake pedal assembly, the accelerator pedal assembly, and the footrest panel are assembled to form the single module component, and the module component is supplied to the vehicle assembling line and provided by being assembled to the dash panel which is the vehicle body. Therefore, it is possible to reduce the assembling time in the vehicle assembling line, improve the productivity, and reduce the number of components and costs.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably to facilitate the description, but the suffixes themselves do not have distinguishable meanings or functions.

In the description of the exemplary embodiments included in the present specification, the specific descriptions of publicly known related technologies will be omitted when it is determined that the specific descriptions may obscure the subject matter of the exemplary embodiments included in the present specification.

Furthermore, it may be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or directly connected to another constituent element, and an intervening constituent element can also be present between the constituent elements.

When one constituent element is described as being "directly coupled to" or "directly connected to" another constituent element, it should be understood that no intervening constituent element is present between the constituent elements.

Singular expressions include plural expressions unless clearly described as different meanings in the context.

In the present specification, it should be understood the terms "comprises," "comprising." "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Furthermore, the term "control unit" or "unit" included in the name of "motor control unit (MCU)" or "hybrid control unit (HCU)" is merely a term widely used to name a control device (controller or control unit) for controlling a particular vehicle function but does not mean a generic function unit.

A controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, a pedal apparatus for a vehicle according to various exemplary embodiments of the present disclosure will be described with reference to the accompanying drawings.

As illustrated in FIGS. 1 to 10, the pedal apparatus for a vehicle according to an exemplary embodiment of the present disclosure is characterized in that a brake pedal assembly 100, an accelerator pedal assembly 200, and a footrest panel 300 are assembled to one another to form a single module component 10, and the single module component 10 is provided by being assembled to a vehicle body 20.

Figure 1:
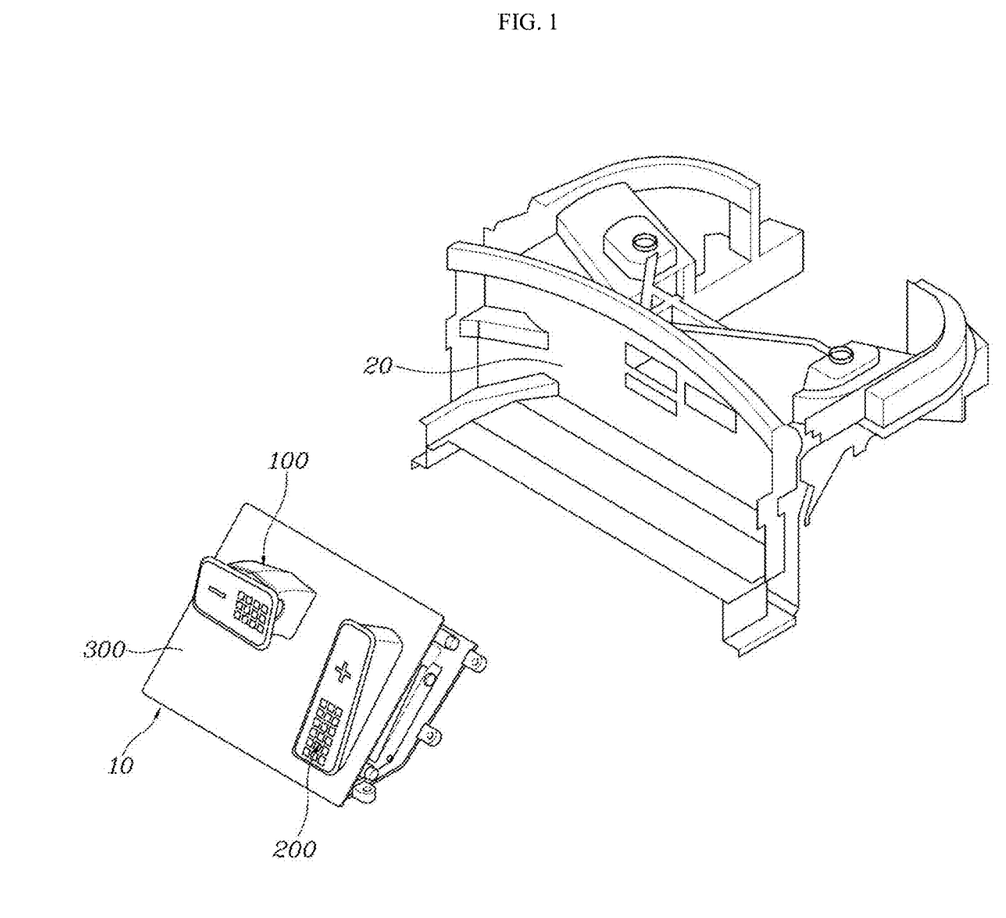
FIG. 1 is a view exemplarily illustrating that a module component according to an exemplary embodiment of the present disclosure is separated from a vehicle body.

The vehicle body 20, on which the module component 10 is provided, may be, but not limited to, a dash panel.

During a process of assembling the component, the brake pedal assembly 100, the accelerator pedal assembly 200, and the footrest panel 300 are assembled to form the single module component 10, and the module component 10 is supplied to the vehicle assembling line and provided by being assembled to the dash panel which is the vehicle body 20. Therefore, it is possible to reduce the assembling time in the vehicle assembling line, improve the productivity, and reduce the number of components and costs.

Figure 2:
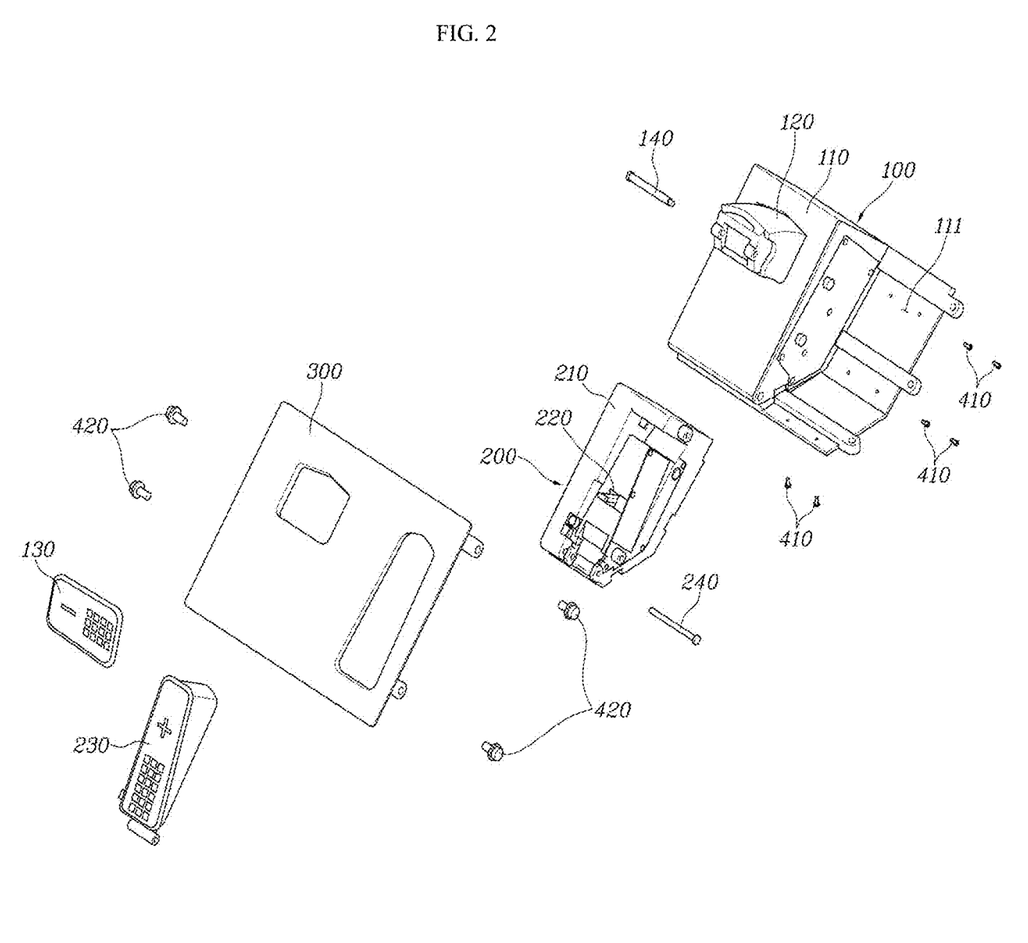
FIG. 2 is an exploded view of a module component according to an exemplary embodiment of the present disclosure.

According to an exemplary embodiment of the present disclosure, the brake pedal assembly 100 has an accelerator pedal seating portion 111, the accelerator pedal assembly 200 is accommodated on the accelerator pedal seating portion 111 and assembled to the brake pedal assembly 100, and the footrest panel 300 is provided by being assembled to the brake pedal assembly 100 and the accelerator pedal assembly 200.

The present configuration will be described in detail. The brake pedal assembly 100 includes: a brake pedal housing 110 configured to define an external appearance: a brake pedal arm 120 coupled to the brake pedal housing 110: and a brake pedal pad 130 coupled to the brake pedal arm 120.

The accelerator pedal seating portion 111 is provided at one side position of the brake pedal housing 110, and the accelerator pedal assembly 200 is fixedly assembled to the accelerator pedal seating portion 111.

That is, the accelerator pedal assembly 200 includes: an accelerator pedal housing 210 configured to define an external appearance: an accelerator pedal arm 220 coupled to the accelerator pedal housing 210: and an accelerator pedal pad 230 coupled to the accelerator pedal arm 220.

Furthermore, the accelerator pedal housing 210 coupled to the accelerator pedal arm 220 is accommodated on the accelerator pedal seating portion 111 and provided by being assembled to the brake pedal housing 110.

Referring to FIG. 2, the brake pedal arm 120 and the brake pedal pad 130 are connected by a connection pin 140, and the accelerator pedal housing 210 and the accelerator pedal pad 230 are connected by a hinge pin 240.

Figure 3:
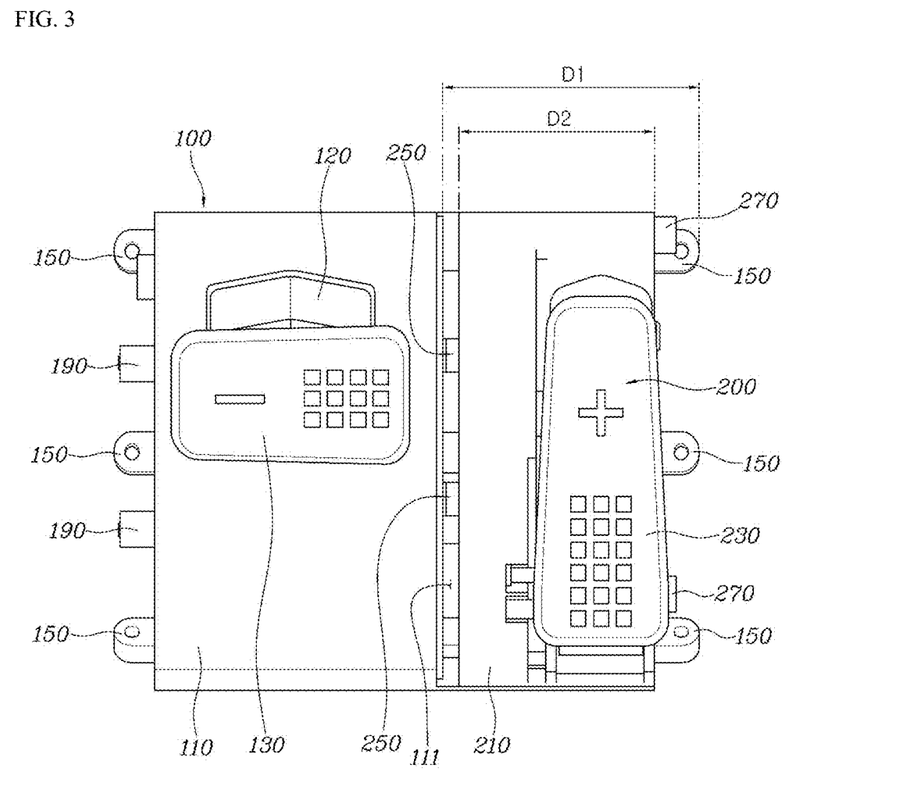
FIG. 3 is a view front view exemplarily illustrating that a brake pedal assembly and an accelerator pedal assembly are assembled according to an exemplary embodiment of the present disclosure.

A state in which the accelerator pedal housing 210 is accommodated on the accelerator pedal seating portion 111 will be described with reference to FIG. 3. A width D1 of the accelerator pedal seating portion 111 in a leftward and rightward direction is greater than a width D2 of the accelerator pedal housing 210 in the leftward and rightward direction so that the accelerator pedal housing 210 is accommodated in the accelerator pedal seating portion 111. Therefore, the accelerator pedal housing 210 may be provided to be sufficiently supported on the accelerator pedal seating portion 111.

Figure 4:
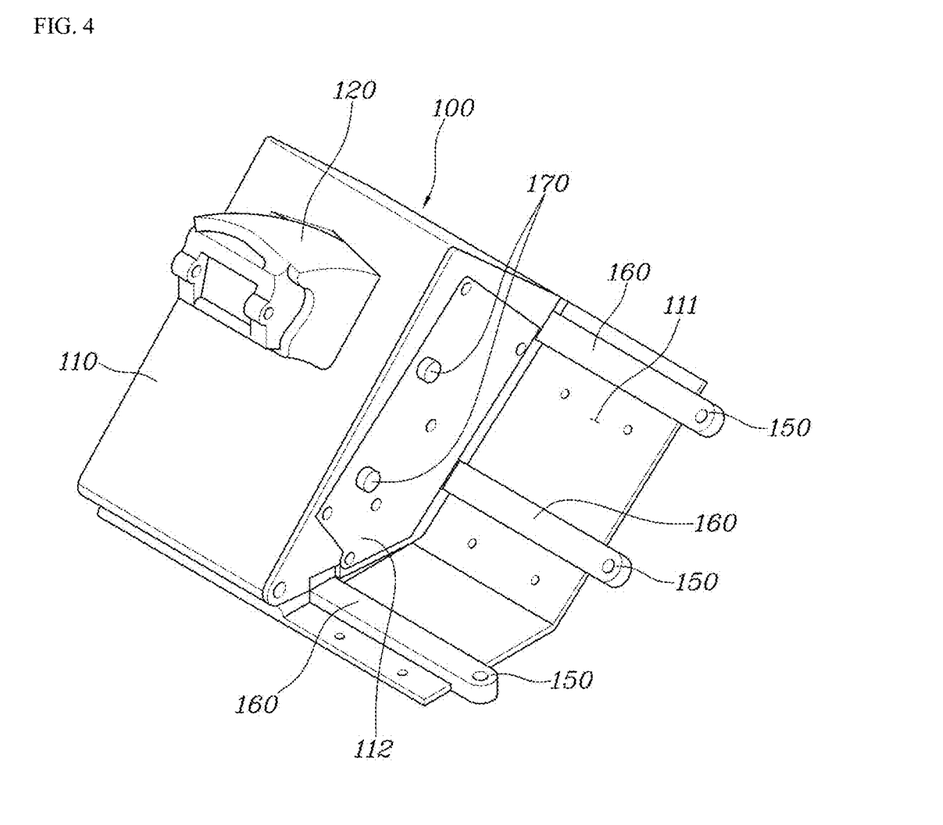
FIG. 4 and FIG. 5 are views of a brake pedal housing according to an exemplary embodiment of the present disclosure.
Figure 5:
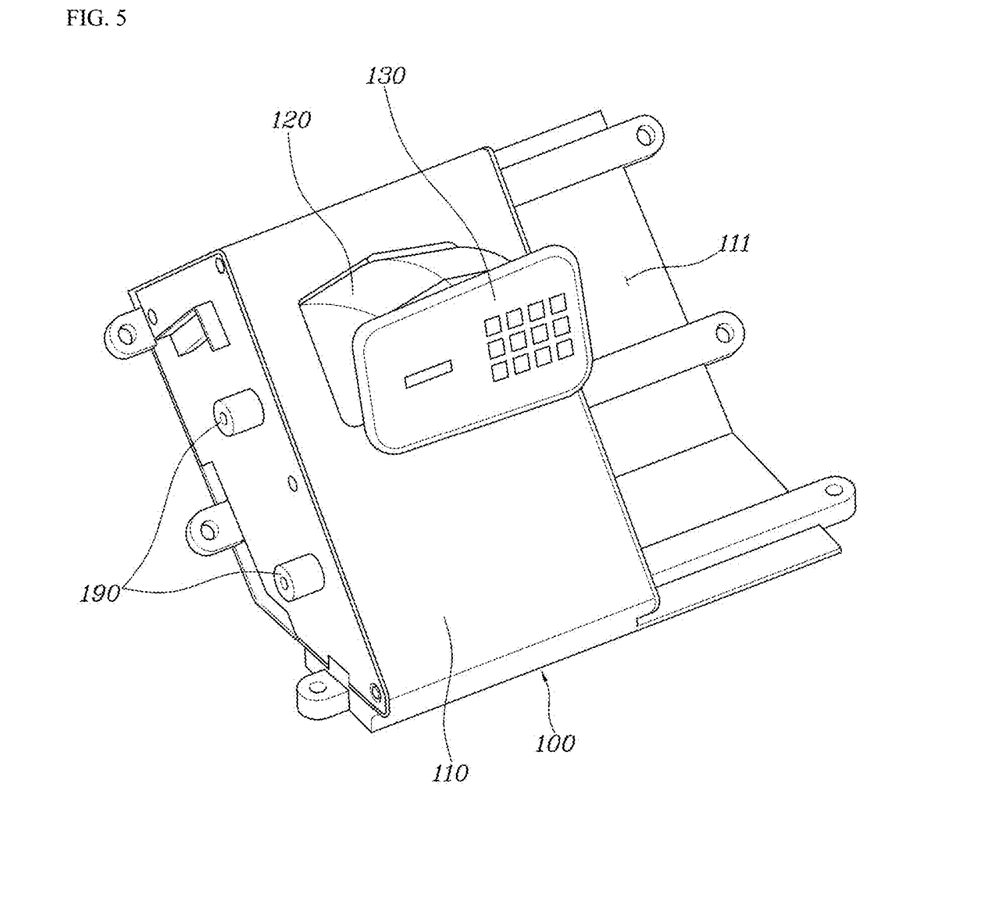

In the brake pedal assembly 100 that requires strength, the brake pedal housing 110, which is a base, is provided by being coupled to the vehicle body 20. To the present end, a plurality of vehicle body coupling portions 150 protrudes in a leftward and rightward direction and is provided at left and right sides of the brake pedal housing 110.

Coupling members, such as bolts or screws, are fastened to the vehicle body 20 while penetrating the vehicle body coupling portions 150 so that the brake pedal housing 110 is fixedly coupled to the vehicle body 20.

A plurality of reinforcement ribs 160 provided on the accelerator pedal seating portion 111 is connected to the vehicle body coupling portions 150 while extending in the leftward and rightward direction thereof.

Because the accelerator pedal assembly 200 is provided by being accommodated on the accelerator pedal seating portion 111, the accelerator pedal seating portion 111 may have strength and rigidity to sufficiently withstand an operating force during the operation of the accelerator pedal. To the present end, the plurality of reinforcement ribs 160 is formed on the accelerator pedal seating portion 111 and connected to the vehicle body coupling portions 150.

A portion of the accelerator pedal seating portion 111, on which the reinforcement ribs 160 are formed, has a sufficiently large thickness, which makes it possible to ensure the strength and rigidity at a necessary level.

Figure 6:
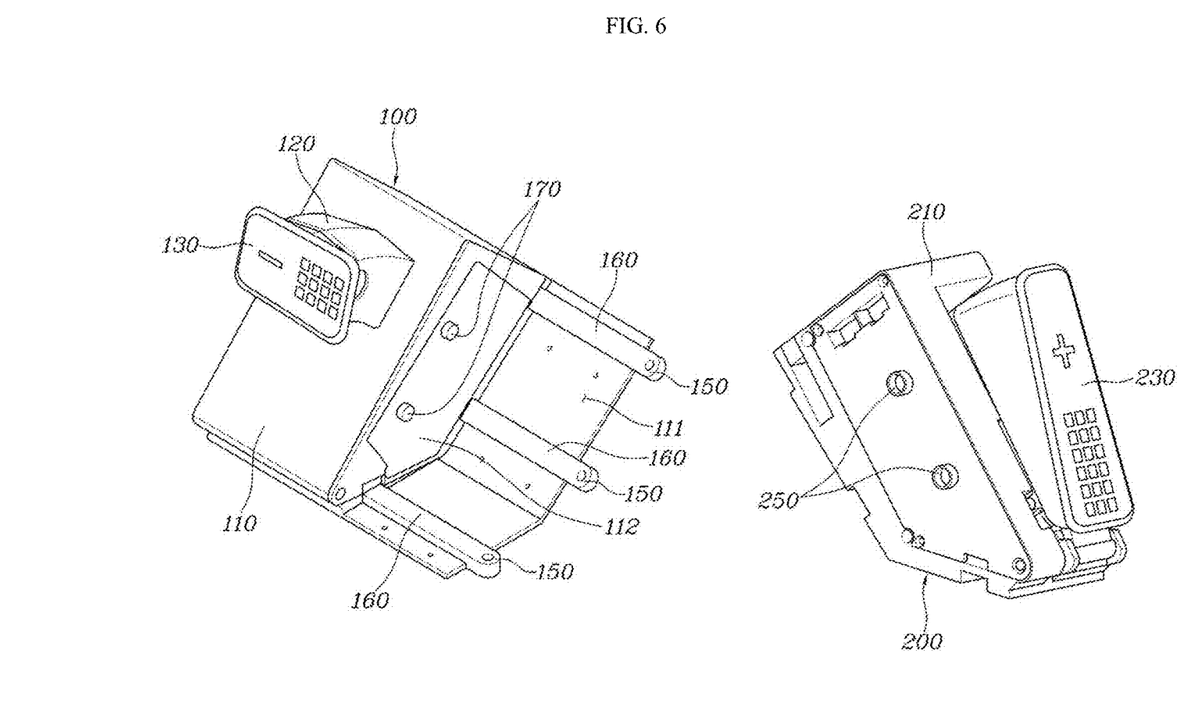
FIG. 6 and FIG. 7 are exploded views exemplarily illustrating the brake pedal housing and an accelerator pedal housing according to an exemplary embodiment of the present disclosure.

To assemble the brake pedal housing 110 and the accelerator pedal housing 210 accommodated on the accelerator pedal seating portion 111, a plurality of coupling protrusions 170 is provided on a sidewall 112 of the brake pedal housing 100 that defines the accelerator pedal seating portion 111, and protrusion assembling grooves 250, into which the coupling protrusions 170 are inserted, are formed in one side surface of the accelerator pedal housing 200 that faces the sidewall 112.

Figure 7:
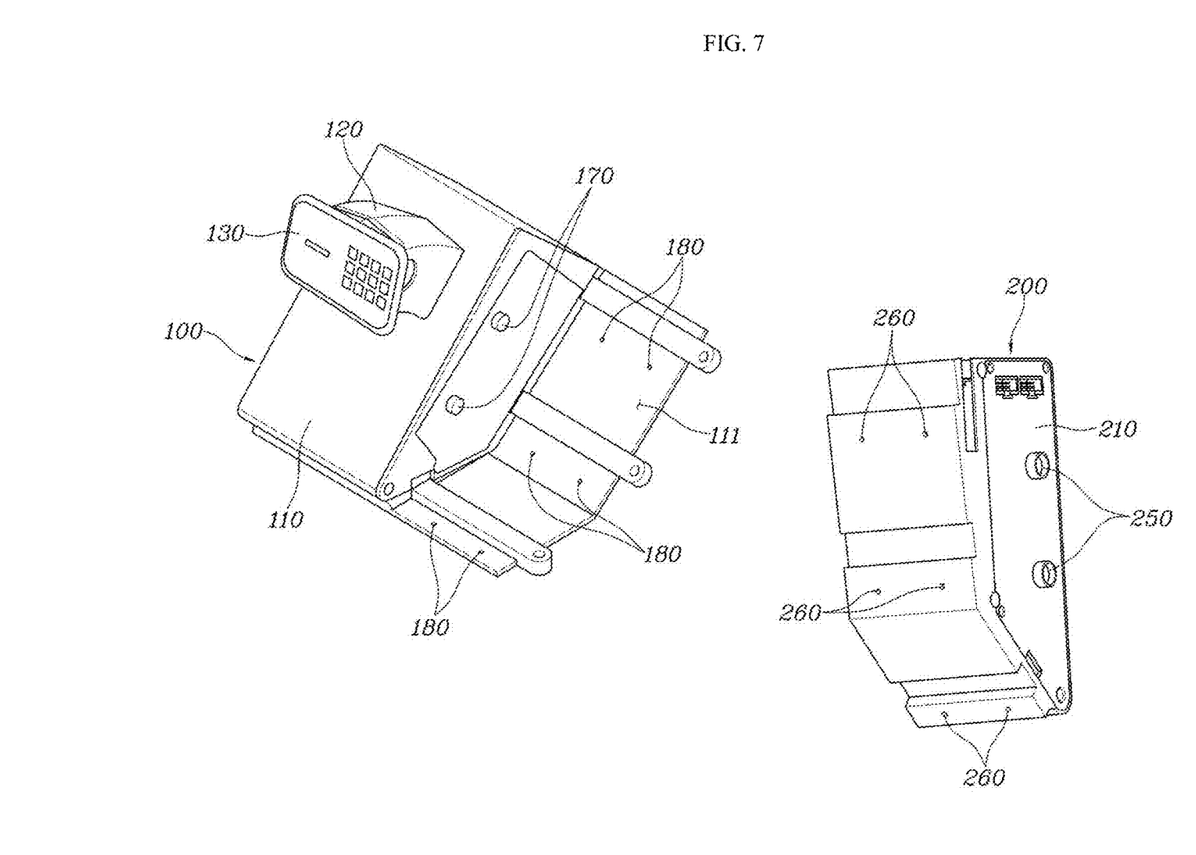

Furthermore, referring to FIG. 7, to assemble the brake pedal housing 110 and the accelerator pedal housing 210 accommodated on the accelerator pedal seating portion 111, a plurality of coupling holes 180 and 260 is formed in the accelerator pedal seating portion 111 and the accelerator pedal housing 210, and the plurality of coupling holes 180 and 260 is matched with one another.

Coupling members 410, such as bolts or screws, illustrated in FIG. 2 are fastened to the coupling hole 180 and 260 so that the brake pedal housing 110 and the accelerator pedal housing 210 are assembled, and the assembled accelerator pedal housing 210 is fixed so as not to move.

Figure 8:
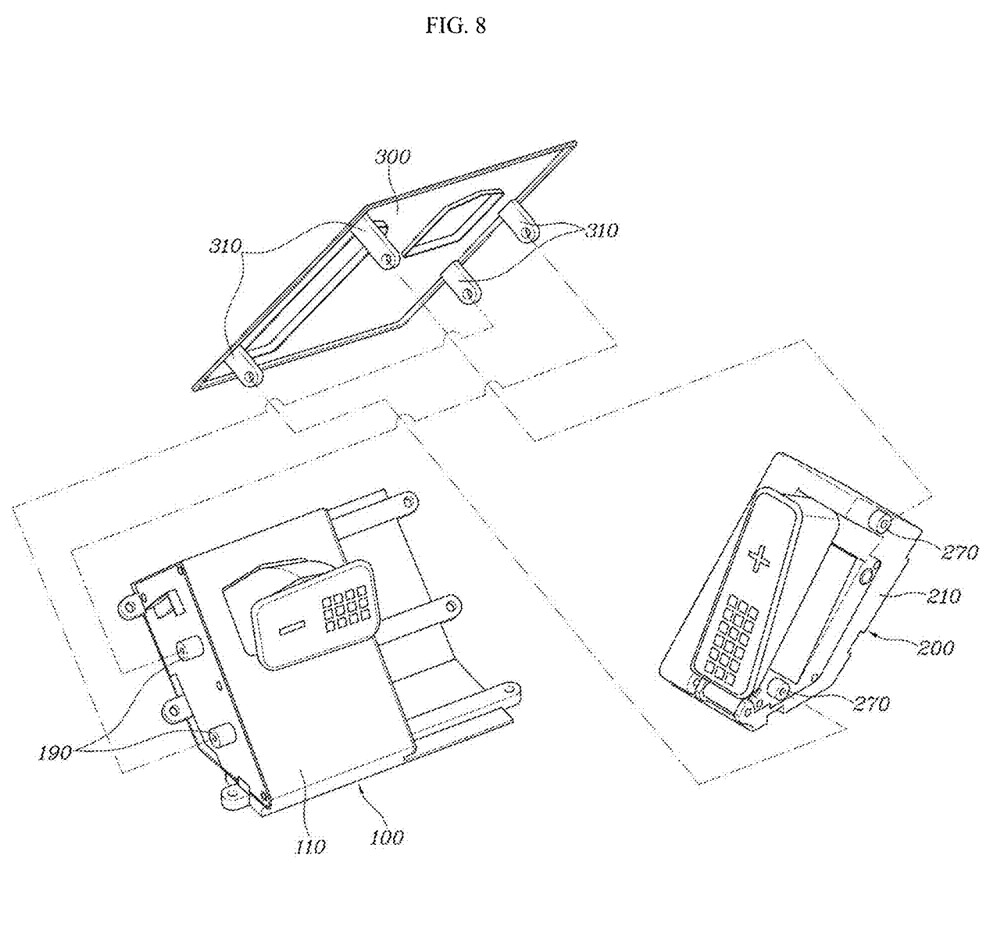
FIG. 8 is an exploded view exemplarily illustrating the brake pedal housing, the accelerator pedal housing, and a footrest panel according to an exemplary embodiment of the present disclosure.

The footrest panel 300 is assembled in the state in which the accelerator pedal housing 210 is accommodated on the accelerator pedal seating portion 111 and assembled to the brake pedal housing 110. In the instant case, the footrest panel 300 is assembled to simultaneously cover the brake pedal housing 110 and the accelerator pedal housing 210. To the present end, two opposite left and right end portions of the footrest panel 300 are assembled to the brake pedal housing 110 and the accelerator pedal housing 210.

That is, referring to FIG. 8 based on the state in which the accelerator pedal housing 210 is positioned on the accelerator pedal seating portion 111, a plurality of assembling protrusions 190 and 270 is provided on one side surface of the brake pedal housing 110 and one side surface of the accelerator pedal housing 210, and a plurality of panel protrusions 310 is provided at left and right sides of the footrest panel 300 and matched with the assembling protrusions 190 and 270.

The panel protrusions 310 of the footrest panel 300 are matched with the assembling protrusions 190 of the brake pedal housing 110 and the assembling protrusion 270 of the accelerator pedal housing 210 in a one-to-one manner. The coupling members 420, such as bolts or screws, illustrated in FIG. 2 are fastened to the assembling protrusions 190 and 270 while penetrating the panel protrusions 310 so that the footrest panel 300 is assembled while simultaneously covering the brake pedal housing 110 and the accelerator pedal housing 210.

Figure 9:
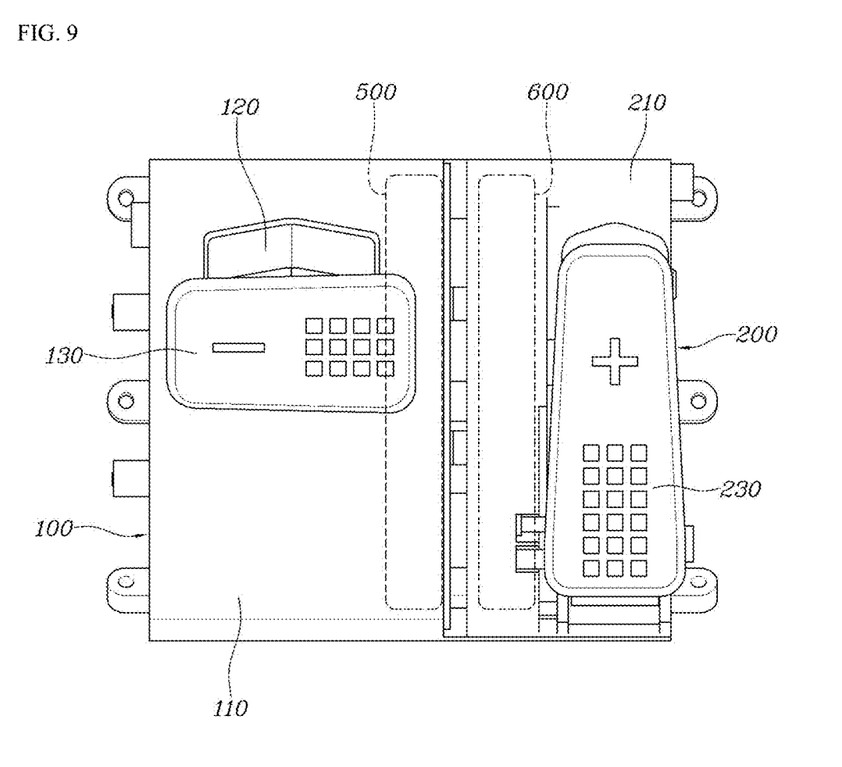
FIG. 9 and FIG. 10 are views for explaining a state in which a brake pedal foldable mechanism and an accelerator pedal foldable mechanism are provided in a pedal apparatus according to an exemplary embodiment of the present disclosure.
Figure 10:
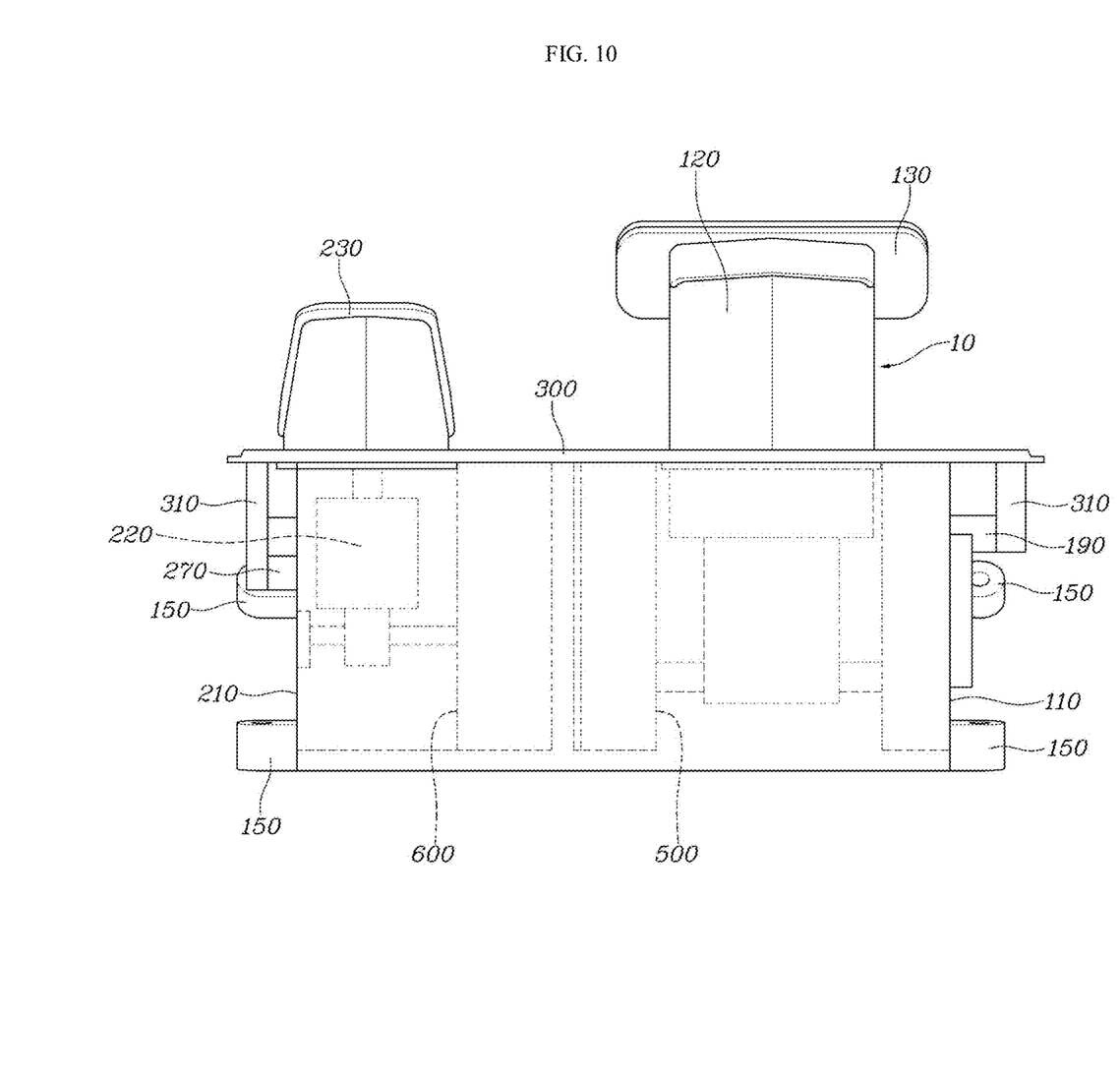

As illustrated in FIGS. 9 to 10, the pedal apparatus according to an exemplary embodiment of the present disclosure may further include a brake pedal foldable mechanism 500 and an accelerator pedal foldable mechanism 600.

By operation of the brake pedal foldable mechanism 500, the brake pedal pad 130 may switch to a hidden state in which the brake pedal pad 130 is hidden in the brake pedal housing 110 so that the driver cannot operate the brake pedal pad 130 and a pop-up state in which the brake pedal pad 130 protrudes from the brake pedal housing 110 so that the driver may operate the brake pedal pad 130.

Furthermore, by operation of the accelerator pedal foldable mechanism 600, the accelerator pedal pad 230 may switch to a hidden state in which the accelerator pedal pad 230 is hidden in the accelerator pedal housing 210 so that the driver cannot operate the accelerator pedal pad 230 and a pop-up state in which the accelerator pedal pad 230 protrudes from the accelerator pedal housing 210 so that the driver may operate the accelerator pedal pad 230.

The brake pedal foldable mechanism 500 and the accelerator pedal foldable mechanism 600 may each include an actuator (motor) configured to generate power, and a gear member configured to connect the actuator and the pedal arm.

The brake pedal foldable mechanism 500 is configured so that the gear member is provided in the brake pedal housing 110, and the gear member may transmit power to the brake pedal arm 120. Therefore, the brake pedal assembly 100 may implement the foldable function by operation of the brake pedal foldable mechanism 500.

Furthermore, the accelerator pedal foldable mechanism 600 is configured so that the gear member is provided in the accelerator pedal housing 210, and the gear member may transmit power to the accelerator pedal arm 220. Therefore, the accelerator pedal assembly 200 may implement the foldable function by operation of the accelerator pedal foldable mechanism 600.

In case that the pedal apparatus according to an exemplary embodiment of the present disclosure is provided with the brake pedal foldable mechanism 500 and the accelerator pedal foldable mechanism 600, the brake pedal foldable mechanism 500 and the accelerator pedal foldable mechanism 600 are disposed to be positioned between the brake pedal pad 130 and the accelerator pedal pad 230. Therefore, it is possible to implement the pedal apparatus including a compact size.

To prevent erroneous braking and acceleration, the regulations prescribe that the brake pedal pad 130 and the accelerator pedal pad 230 of the pedal apparatus need to be spaced from each other at a predetermined distance.

A predetermined empty space is defined between the brake pedal pad 130 and the accelerator pedal pad 230 when the brake pedal pad 130 and the accelerator pedal pad 230 are spaced from each other in the leftward and rightward direction thereof. The brake pedal foldable mechanism 500 and the accelerator pedal foldable mechanism 600, which are the foldable mechanisms, are disposed in the empty space between the brake pedal pad 130 and the accelerator pedal pad 230 so that an overall size of the pedal apparatus including the foldable mechanisms may be reduced.

Furthermore, in the case of the pedal apparatus including the brake pedal foldable mechanism 500 and the accelerator pedal foldable mechanism 600 according to an exemplary embodiment of the present disclosure, the footrest panel 300 is assembled in the state in which the accelerator pedal housing 210 is accommodated on the accelerator pedal seating portion 111 and assembled to the brake pedal housing 110. Furthermore, the footrest panel 300 is assembled to simultaneously cover the brake pedal housing 110 and the accelerator pedal housing 210, and the brake pedal housing 110 and the accelerator pedal housing 210) are provided to be in surface-contact with the footrest panel 300 to support the footrest panel 300. Therefore, it is possible to ensure the overall strength and rigidity of the pedal apparatus including the footrest panel 300 and safely protect the brake pedal foldable mechanism 500 provided in the brake pedal housing 110 and the accelerator pedal foldable mechanism 600 provided in the accelerator pedal housing 210.

The brake pedal housing 110 and the accelerator pedal housing 210 are provided to be in surface-contact with the footrest panel 300 to support the footrest panel 300.

According to the exemplary embodiment of the present disclosure, by the operations of the actuator and the gear member of the brake pedal foldable mechanism 500, the brake pedal may switch to the hidden state in which the brake pedal is hidden in the brake pedal housing 110 so that the driver cannot operate the brake pedal in the autonomous driving mode and the pop-up state in which the brake pedal protrudes from the brake pedal housing 110 so that the driver may operate the brake pedal in the manual driving mode.

Furthermore, by the operations of the actuator and the gear member of the accelerator pedal foldable mechanism 600, the accelerator pedal may switch to the hidden state in which the accelerator pedal is hidden in the accelerator pedal housing 210 so that the driver cannot operate the accelerator pedal in the autonomous driving mode and the pop-up state in which the accelerator pedal protrudes from the accelerator pedal housing 210 so that the driver may operate the accelerator pedal in the manual driving mode.

According to the exemplary embodiment of the present disclosure, the brake pedal housing 110 and the brake pedal arm 120 are coupled and assembled, the accelerator pedal housing 210) and the accelerator pedal arm 220 are coupled and assembled, the accelerator pedal housing 210 coupled to the accelerator pedal arm 220 is accommodated on the accelerator pedal seating portion 111, the accelerator pedal housing 210 and the brake pedal housing 110 are assembled, the footrest panel 300 is assembled to the brake pedal housing 110 and the accelerator pedal housing 210 and simultaneously covers the brake pedal housing 110 and the accelerator pedal housing 210, and the brake pedal pad 130 and the accelerator pedal pad 230 are assembled to the brake pedal arm 120 and the accelerator pedal arm 220 so that the brake pedal assembly 100, the accelerator pedal assembly 200, and the footrest panel 300 are assembled to one another to form the single module component 10.

The above-mentioned order of assembling the module component 10 may be changed as the order of some processes is changed, as necessary.

According to the pedal apparatus for a vehicle according to an exemplary embodiment of the present disclosure described above, during the process of assembling the component, the brake pedal assembly 100, the accelerator pedal assembly 200, and the footrest panel 300 are assembled to form the single module component 10, and the module component 10 is supplied to the vehicle assembling line and provided by being assembled to the dash panel which is the vehicle body 20. Therefore, it is possible to reduce the assembling time in the vehicle assembling line, improve the productivity, and reduce the number of components and costs.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A pedal apparatus for a vehicle, the pedal apparatus comprising:
    a brake pedal assembly, an accelerator pedal assembly, and a footrest panel that are assembled to one another to form a single module component,
    wherein the single module component is provided by being assembled to a vehicle body,
    wherein the brake pedal assembly includes:
        a brake pedal housing to which a brake pedal arm is coupled, wherein the brake pedal housing includes an accelerator pedal seating portion provided at one side of the brake pedal housing; and
        a brake pedal pad coupled to an end of the brake pedal arm,
    wherein the accelerator pedal assembly includes:
        an accelerator pedal housing to which an accelerator pedal arm is coupled,
    wherein the accelerator pedal housing is positioned on the accelerator pedal seating portion, and assembled to the brake pedal housing; and
        an accelerator pedal pad coupled to an end of the accelerator pedal arm, and
    wherein the brake pedal assembly implements a foldable function by operation of a brake pedal foldable mechanism fixed to the brake pedal housing and connected to the brake pedal arm.

2. The pedal apparatus of claim 1, wherein the footrest panel is assembled to the brake pedal assembly and the accelerator pedal assembly.

3. The pedal apparatus of claim 1, wherein first and second opposite end portions of the footrest panel are assembled to the brake pedal housing and the accelerator pedal housing so that the footrest panel simultaneously covers the brake pedal housing and the accelerator pedal housing in a state in which the accelerator pedal housing is accommodated on the accelerator pedal seating portion and assembled to the brake pedal housing.

4. The pedal apparatus of claim 1, wherein a width of the accelerator pedal seating portion in a leftward and rightward direction is greater than a width of the accelerator pedal housing in the leftward and rightward direction so that the accelerator pedal housing is provided to be accommodated in the accelerator pedal seating portion.

5. The pedal apparatus of claim 1, wherein a plurality of vehicle body coupling portions protrudes from the brake pedal housing in a leftward and rightward direction thereof.

6. The pedal apparatus of claim 5, wherein a plurality of reinforcement ribs extends from the accelerator pedal seating portion in the leftward and rightward direction and is connected to the vehicle body coupling portions.

7. The pedal apparatus of claim 1,
    wherein a plurality of coupling protrusions is provided on a sidewall of the brake pedal housing that defines the accelerator pedal seating portion, and wherein protrusion assembling grooves, into which the coupling protrusions are inserted, are formed in one side surface of the accelerator pedal housing that faces the sidewall.

8. The pedal apparatus of claim 1, wherein a plurality of coupling holes, which is matched with one another, is formed in the accelerator pedal seating portion and the accelerator pedal housing, and the brake pedal housing and the accelerator pedal housing are assembled by coupling members fastened to the coupling holes.

9. The pedal apparatus of claim 1,
wherein a plurality of assembling protrusions is provided on one side surface of the brake pedal housing and one side surface of the accelerator pedal housing in a state in which the accelerator pedal housing is positioned on the accelerator pedal seating portion,
wherein a plurality of panel protrusions, which is matched with the assembling protrusions, is formed at first and second opposite end portions of the footrest panel, and
wherein the footrest panel is assembled to simultaneously cover the brake pedal housing and the accelerator pedal housing by coupling members fastened to the assembling protrusions while penetrating the panel protrusions.

10. The pedal apparatus of claim 1, wherein the accelerator pedal assembly implements a foldable function by operation of an accelerator pedal foldable mechanism fixed to the accelerator pedal housing and connected to the accelerator pedal arm.

11. The pedal apparatus of claim 10, wherein the brake pedal foldable mechanism and the accelerator pedal foldable mechanism are disposed to be positioned between the brake pedal pad and the accelerator pedal pad.

12. The pedal apparatus of claim 10,
wherein the brake pedal foldable mechanism includes:
an actuator configured to generate power; and
a gear member configured to engage the actuator and the brake pedal arm, and
wherein the accelerator pedal foldable mechanism includes:
an actuator configured to generate power; and
a gear member configured to engage the actuator and the accelerator pedal arm.

13. The pedal apparatus of claim 12,
wherein by operations of the actuator and the gear member of the brake pedal foldable mechanism, a brake pedal switches to a hidden state in which the brake pedal is hidden in the brake pedal housing so that a driver cannot operate the brake pedal in an autonomous driving mode and a pop-up state in which the brake pedal protrudes from the brake pedal housing so that the driver operates the brake pedal in a manual driving mode, and
wherein by operations of the actuator and the gear member of the accelerator pedal foldable mechanism, an accelerator pedal switches to a hidden state in which the accelerator pedal is hidden in the accelerator pedal housing so that the driver cannot operate the accelerator pedal in the autonomous driving mode and a pop-up state in which the accelerator pedal protrudes from the accelerator pedal housing so that the driver operates the accelerator pedal in the manual driving mode.

14. The pedal apparatus of claim 1,
wherein the footrest panel is assembled in a state in which the accelerator pedal housing is accommodated on the accelerator pedal seating portion and assembled to the brake pedal housing, and
wherein the footrest panel is provided to be in surface-contact with the brake pedal housing and the accelerator pedal housing while simultaneously covering the brake pedal housing and the accelerator pedal housing so that the brake pedal housing and the accelerator pedal housing support the footrest panel.

15. The pedal apparatus of claim 1, wherein the brake pedal housing and the brake pedal arm are coupled and assembled, the accelerator pedal housing and the accelerator pedal arm are coupled and assembled, the accelerator pedal housing is accommodated on the accelerator pedal seating portion, the accelerator pedal housing and the brake pedal housing are assembled, the footrest panel is assembled to the brake pedal housing and the accelerator pedal housing to simultaneously cover the brake pedal housing and the accelerator pedal housing, and the brake pedal pad and the accelerator pedal pad are assembled to the brake pedal arm and the accelerator pedal arm so that the brake pedal assembly, the accelerator pedal assembly, and the footrest panel are assembled to one another to form the single module component.

16. A pedal apparatus for a vehicle, the pedal apparatus comprising:
a brake pedal assembly, an accelerator pedal assembly, and a footrest panel that are assembled to one another to form a single module component,
wherein the single module component is provided by being assembled to a vehicle body,
wherein the brake pedal assembly includes:
a brake pedal housing to which a brake pedal arm is coupled, wherein the brake pedal housing includes an accelerator pedal seating portion provided at one side of the brake pedal housing; and
a brake pedal pad coupled to an end of the brake pedal arm,
wherein the accelerator pedal assembly includes:
an accelerator pedal housing to which an accelerator pedal arm is coupled,
wherein the accelerator pedal housing is positioned on the accelerator pedal seating portion, and assembled to the brake pedal housing; and
an accelerator pedal pad coupled to an end of the accelerator pedal arm,
wherein a plurality of vehicle body coupling portions protrudes from the brake pedal housing in a leftward and rightward direction thereof, and
wherein a plurality of reinforcement ribs extends from the accelerator pedal seating portion in the leftward and rightward direction and is connected to the vehicle body coupling portions.

17. A pedal apparatus for a vehicle, the pedal apparatus comprising:
a brake pedal assembly, an accelerator pedal assembly, and a footrest panel that are assembled to one another to form a single module component,
wherein the single module component is provided by being assembled to a vehicle body,
wherein the brake pedal assembly includes:
a brake pedal housing to which a brake pedal arm is coupled, wherein the brake pedal housing includes an accelerator pedal seating portion provided at one side of the brake pedal housing; and
a brake pedal pad coupled to an end of the brake pedal arm,
wherein the accelerator pedal assembly includes:
an accelerator pedal housing to which an accelerator pedal arm is coupled, wherein the accelerator pedal housing is positioned on the accelerator pedal seating portion, and assembled to the brake pedal housing; and an accelerator pedal pad coupled to an end of the accelerator pedal arm, wherein a plurality of coupling protrusions is provided on a sidewall of the brake pedal housing that defines the accelerator pedal seating portion, and wherein protrusion assembling grooves, into which the coupling protrusions are inserted, are formed in one side surface of the accelerator pedal housing that faces the sidewall.

18. A pedal apparatus for a vehicle, the pedal apparatus comprising:

a brake pedal assembly, an accelerator pedal assembly, and a footrest panel that are assembled to one another to form a single module component, wherein the single module component is provided by being assembled to a vehicle body, wherein the brake pedal assembly includes:

a brake pedal housing to which a brake pedal arm is coupled, wherein the brake pedal housing includes an accelerator pedal seating portion provided at one side of the brake pedal housing; and a brake pedal pad coupled to an end of the brake pedal arm, wherein the accelerator pedal assembly includes:

an accelerator pedal housing to which an accelerator pedal arm is coupled, wherein the accelerator pedal housing is positioned on the accelerator pedal seating portion, and assembled to the brake pedal housing; and an accelerator pedal pad coupled to an end of the accelerator pedal arm, wherein a plurality of assembling protrusions is provided on one side surface of the brake pedal housing and one side surface of the accelerator pedal housing in a state in which the accelerator pedal housing is positioned on the accelerator pedal seating portion, wherein a plurality of panel protrusions, which is matched with the assembling protrusions, is formed at first and second opposite end portions of the footrest panel, and wherein the footrest panel is assembled to simultaneously cover the brake pedal housing and the accelerator pedal housing by coupling members fastened to the assembling protrusions while penetrating the panel protrusions.

* * * * *